S. F. DOUGLASS.
VEHICLE SIGNAL.
APPLICATION FILED APR. 15, 1913.
1,146,693.
Patented July 13, 1915.
2 SHEETS—SHEET 1.
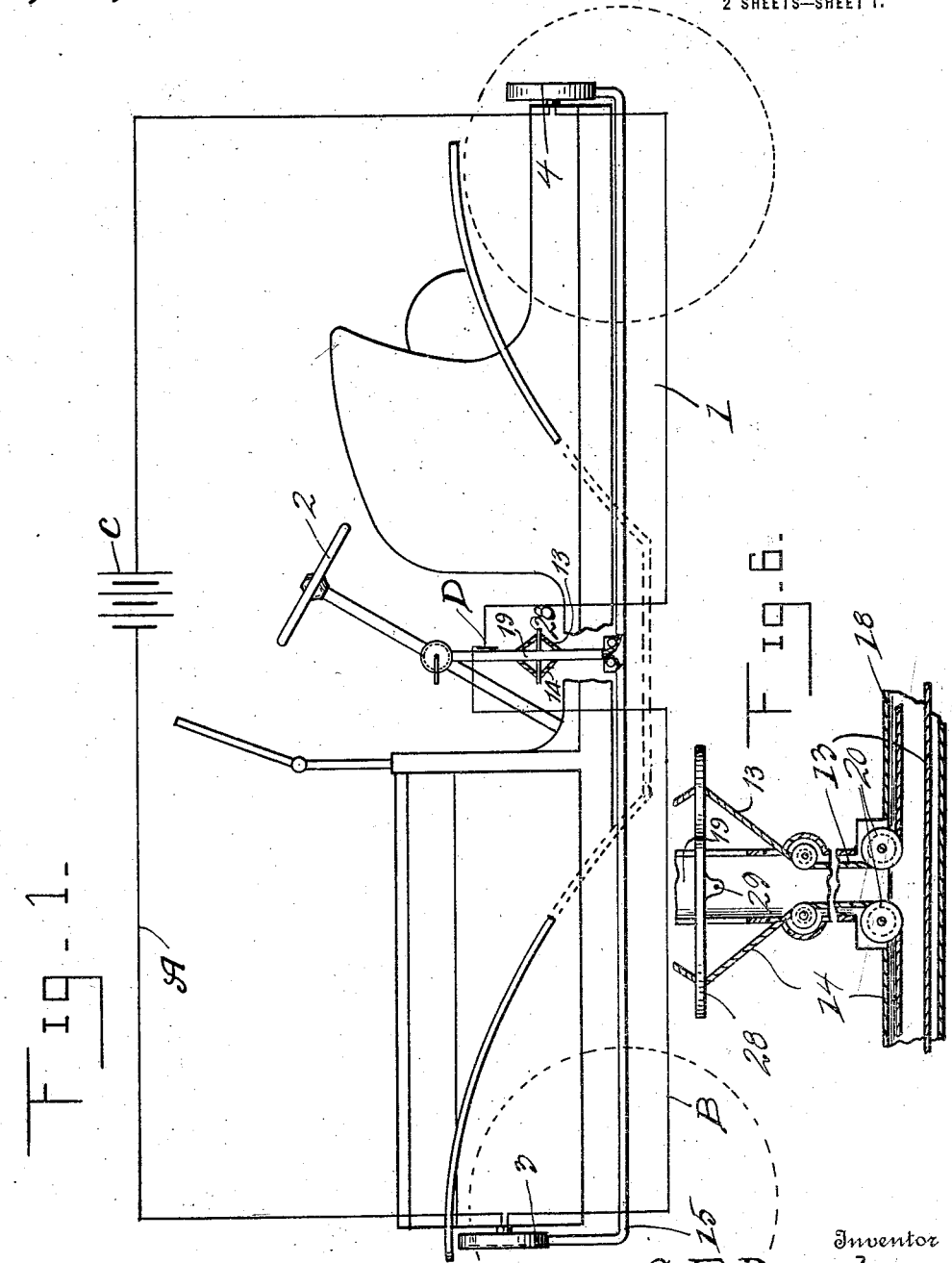
Witnesses
Chas. R. Bealle.
H. K. Martin
Inventor
S. F. Douglass.
By Randolph Jr.
Attorney

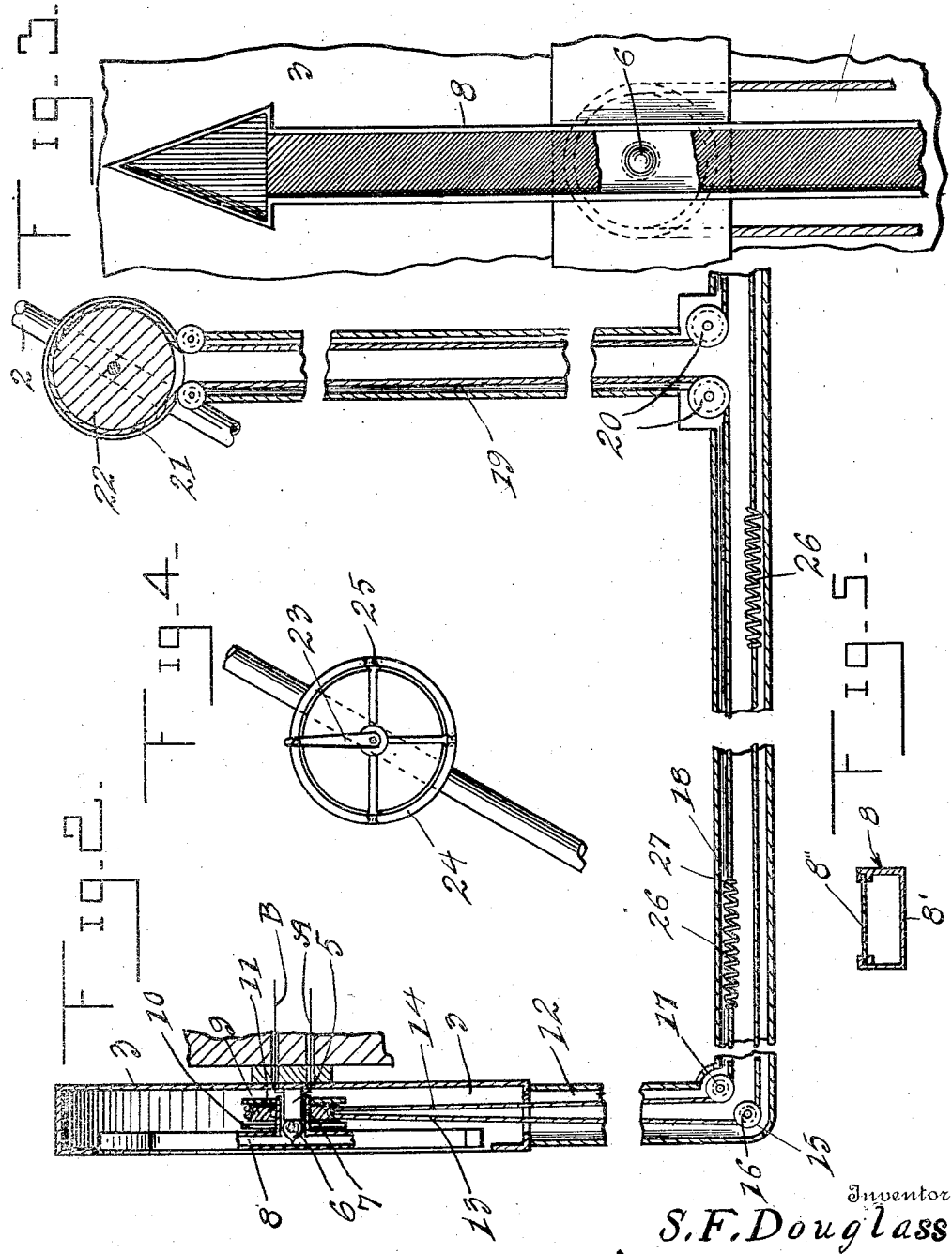

UNITED STATES PATENT OFFICE.

SAMUEL F. DOUGLASS, OF PRAIRIE DU ROCHER, ILLINOIS, ASSIGNOR TO VEHICLE SIGNAL COMPANY, A CORPORATION OF ARIZONA.

VEHICLE-SIGNAL.

1,146,693.  Specification of Letters Patent.  Patented July 13, 1915.

Application filed April 15, 1913. Serial No. 761,373.

*To all whom it may concern:*

Be it known that I, SAMUEL F. DOUGLASS, a citizen of the United States, residing at Prairie du Rocher, in the county of Randolph and State of Illinois, have invented certain new and useful Improvements in Vehicle-Signals; and I do hereby declare the following to be a full, clear, and exact description of the invention, such as will enable others skilled in the art to which it appertains to make and use the same.

This invention relates to motor vehicle signals, and one of the principal objects of the invention is to provide reliable and efficient means to be displayed at the front and rear ends of a motor vehicle for indicating the direction the vehicle is about to take in turning corners or rounding curves and to indicate to pedestrians or motorists the conditions which exist in advance of the machine and the intention of the driver as to direction to be taken.

Another object of the invention is to provide a signal or indicator at the front and rear ends of an automobile which may be illuminated at night and seen readily during the day, said indicator or signal to be operated by the driver of the machine to be turned in either direction to indicate the direction at which the driver desires to turn or to give other information to drivers of other machines and pedestrians with a view to avoiding accident to pedestrians or vehicles.

These and other objects may be attained by means of the construction illustrated in the accompanying drawings, in which:

Figure 1 is a side elevation of a motor vehicle provided with a signal made in accordance with my invention; Fig. 2 is an enlarged sectional view of the signal and its connected mechanism to be placed at the front and rear of the machine; Fig. 3 is a view in elevation of the indicator; Fig. 4 is a detail view in elevation showing the mechanism for operating the signal; Fig. 5 is a transverse sectional view of the indicator; and Fig. 6 is a detail sectional view of the mechanism for operating the device by foot.

Referring to the drawings by characters of reference, 1 indicates the body portion of an automobile, and 2 the steering wheel of the same. Connected to the front of the vehicle is a casing 3, and to the rear end of the machine a similar casing 4. Within the casing I preferably provide an outstanding portion 5 which is secured to the rear wall thereof, and is adapted to form a socket for the reception of a suitable electric lamp 6. This extension 5 is preferably provided with a smooth surface around which a sleeve 7 is adapted to rotate. This sleeve 7 is provided at one extremity with an extension to which is secured the indicator 8. This indicator 8 is preferably composed of a casing 8', which is substantially U-shaped in cross section, as clearly illustrated in Fig. 5, and is provided on one face with a transparent or translucent material, as clearly indicated at 8''.

A suitable pulley 9 is secured to the sleeve 7 intermediate its ends, and is adapted to be held in position by means of the disks 10 and 11 which prevent the said indicator from becoming accidentally displaced during the time the same is in position on the car.

Extending downwardly from the casing 3, I preferably provide a tubing 12 which is adapted to form a housing for the flexible members 13 and 14, which are adapted to pass around the pulley and operate on the same. The tubing 12 extends downwardly to the desired point and is provided at its lower extremity with an elbow 15, in which are rotatably mounted a pulley 16 and a pulley 17, over which the flexible members 13 and 14 are adapted to pass on their way to the controlling mechanism.

A horizontal tubing 18 extends longitudinally beneath the car, as clearly illustrated in Fig. 1, and throughout its entire length. Intermediate the ends of this tubing I preferably provide a tubing 19, which is connected to the tubing 18 in any desired manner. The joint between the tubings is provided with rotatably mounted pulleys, over which the flexible member is adapted to pass on its way upward to the controlling mechanism.

The tubing 19 terminates at its upper extremity in an enlarged portion 21, in which is rotatably mounted a drum 22. This drum 22 is connected with a lever 23, which lever controls the rotation of the drum 22 and is held in any desired position by means of the ring 24, which is provided with notches 25 in which a suitable depending portion formed on the lever is adapted to seat.

The flexible members 13 and 14 are exas clearly illustrated in Fig. 2, and pass downwardly over the pulleys 16 and 17, respectively. The said flexible members then pass rearwardly through the tubing and are provided intermediate their length with resilient connections 26, which are preferably coil springs attached to the ends of the flexible members, as clearly illustrated at 27. As shown in Fig. 2, the flexible members then pass upwardly and over the pulleys 20 and through the tubing 19 into the enlarged portion 21, in which the drum 22 is rotatably mounted. These flexible members then pass upwardly over the drum 22, with which they frictionally engage, so that when the drum is rotated it will cause the flexible members to slide through the tubes and rotate the pulley 9, whereby the indicator 8 is thrown to the desired position.

The indicator on the rear of the car is of the same identical construction with that carried on the front of the car, and it will be seen that when the indicator on the front of the car is thrown to its desired position the one carried on the rear of the car will be in a corresponding position, so that the signal will be given at each end and thereby confusion will be avoided.

In order that the indicators may be operated from either the hand controlling mechanism or by foot power, I provide a treadle 28 which is pivotally mounted in a vertical slot formed in the tubing 19, as clearly illustrated at 29. This treadle is extended, as clearly illustrated in Fig. 6, and laterally of the tube 19 and is secured at opposite ends to the flexible members 13 and 14 intermediate the pulleys 20 and the drum 22, so that upon pressure on either side of the treadle 28 the same will rock on the pivot 29 and cause pull on the flexible members 13 or 14 as desired, whereby the indicators carried at each end of the car may be thrown to the desired position.

The outstanding portion 5 is preferably formed with a recess in which the base of the lamp 6 is adapted to be inserted. This recess is provided with the usual electric contacts, to which the wires A and B are adapted to be secured. The wire A passes rearwardly through the car and is connected with a battery C, or other suitable source of supply, while the wire B extends rearwardly and is adapted to be connected with a suitable switch or circuit controlling device D, carried on the steering post of the car within easy reach of the driver. It will thus be seen that the indicator will be visible at all times, and be suitable for use in darkness as well as in the light.

The operation of my invention may be briefly described as follows: When the arrow point at the front and rear of the machine is directed upwardly, it is the intention of the driver of the vehicle to go straight forward. If the machine is about to stop the arrow point is thrown downward either by means of the foot pedal or the lever. If the arrow point is turned toward the right, it will be understood that it is the intention of the driver to turn in that direction; if toward the left the vehicle is about to turn in that direction.

It is intended to have established a code of signals which will be understood by automobile drivers and pedestrians generally. The indicating arrows at the front and rear of the machine may be provided with transparent or translucent glass fronts made in different colors to indicate the front and rear of the machine in the dark when the electric lights are ignited and to indicate by color in the daytime.

My invention is simple in construction, can be readily placed upon any motor vehicle, is not liable to get out of order and will save accident and injury in many cases where crowded automobiles and many pedestrians are passing back and forth across the streets or roads.

While in the foregoing I have shown and described the preferred embodiment of my invention, I wish it to be understood that I may change the specific arrangements of parts without in any way departing from the spirit and scope of my invention.

Having thus fully described my invention, what I claim is:

In combination, a horizontal tube, casings communicating with the ends of said tube, drums rotatably mounted in said casings, indicators secured to said drums, a vertical tube secured intermediate the ends of and communicating with said horizontal tube, a casing secured to the upper end of said vertical tube, an operating drum rotatably mounted in the last mentioned casing, an operating crank secured to the last mentioned drum, a pedal pivotally secured in said vertical tube, pulleys rotatably mounted in the ends of said horizontal tube and at the point of intersection of said horizontal and vertical tubes, and flexible members connected with the indicator drums, extending within said horizontal tube, over said pulleys and upwardly within said vertical tube and being connected with said operating drum and each secured to one end of said pedal.

In testimony whereof I affix my signature in presence of two witnesses.

SAMUEL F. DOUGLASS.

Witnesses:
 WM. E. RUTLEDGE,
 LILLIAN B. KELLEY.